US012760210B2

(12) United States Patent
Ochiai et al.

(10) Patent No.: US 12,760,210 B2
(45) Date of Patent: Oct. 13, 2026

(54) RESIN COMPOSITION FOR ADHESIVE LAYER, AND MULTILAYER TUBE

(71) Applicants: POLYPLASTICS-EVONIK CORPORATION, Tokyo (JP); TORAY INDUSTRIES, INC., Tokyo (JP)

(72) Inventors: Takuya Ochiai, Tokyo (JP); Yosuke Onoue, Nagoya (JP); Rei Sato, Nagoya (JP); Kazuya Okubo, Nagoya (JP)

(73) Assignees: TORAY INDUSTRIES, INC., Tokyo (JP); POLYPLASTICS-EVONIK CORPORATION, Tokyo (JP)

(*) Notice: Subject to any disclaimer, the term of this patent is extended or adjusted under 35 U.S.C. 154(b) by 408 days.

(21) Appl. No.: 18/695,046

(22) PCT Filed: Apr. 27, 2022

(86) PCT No.: PCT/JP2022/019171
§ 371 (c)(1),
(2) Date: Mar. 25, 2024

(87) PCT Pub. No.: WO2023/079775
PCT Pub. Date: May 11, 2023

(65) Prior Publication Data

US 2025/0250472 A1 Aug. 7, 2025

(30) Foreign Application Priority Data

Nov. 2, 2021 (JP) ................................ 2021-179578

(51) Int. Cl.
*C09J 177/00* (2006.01)
*B29C 48/00* (2019.01)
(Continued)

(52) U.S. Cl.
CPC ........... *C09J 177/00* (2013.01); *B29C 48/022* (2019.02); *B29C 48/09* (2019.02); *B29C 48/21* (2019.02);
(Continued)

(58) Field of Classification Search
CPC ...... C09J 177/00; B29C 48/022; B29C 48/09; B29C 48/21; B29K 2023/08;
(Continued)

(56) References Cited

U.S. PATENT DOCUMENTS

| | | | |
|---|---|---|---|
| 6,723,400 | B1 | 4/2004 | Ishio et al. |
| 2011/0021707 | A1 | 1/2011 | Kobayashi et al. |
| 2019/0330470 | A1 | 10/2019 | Yamanaka et al. |

FOREIGN PATENT DOCUMENTS

| | | | |
|---|---|---|---|
| JP | 7-82479 | A | 3/1995 |
| JP | 10-296889 | A | 11/1998 |

(Continued)

OTHER PUBLICATIONS

English machine translation JP2008-087168. (Year: 2008).*
(Continued)

*Primary Examiner* — Michael C Miggins
(74) *Attorney, Agent, or Firm* — Birch, Stewart, Kolasch & Birch, LLP

(57) ABSTRACT

The present disclosure relates to a resin composition for an adhesive layer. The resin composition contains: a polyphenylene sulfide-based resin (A); a polyamide resin (B); a first thermoplastic resin (C) containing at least one type of functional group selected from the group consisting of an epoxy group, an acid anhydride group, a carboxyl group, a carboxylic acid salt, and a carboxylic acid ester; and a second thermoplastic resin (D) that is free of epoxy groups, acid anhydride groups, carboxyl groups, carboxylic acid salts, and carboxylic acid esters. The resin composition
(Continued)

contains, with respect to 100 parts by weight of the polyphenylene sulfide-based resin (A), from 80 to 300 parts by weight of the polyamide resin (B), from 20 to 200 parts by weight of the first thermoplastic resin (C), and from 10 to 100 parts by weight of the second thermoplastic resin (D), and a terminal amino group concentration of the polyamide resin (B) is from 48 to 120 mmol/kg.

7 Claims, 1 Drawing Sheet

(51) Int. Cl.

| | |
|---|---|
| ***B29C 48/09*** | (2019.01) |
| ***B29C 48/21*** | (2019.01) |
| ***B29K 23/00*** | (2006.01) |
| ***B29K 33/04*** | (2006.01) |
| ***B29K 77/00*** | (2006.01) |
| ***B29K 81/00*** | (2006.01) |
| ***B29K 105/00*** | (2006.01) |

(52) U.S. Cl.

CPC ...... *B29K 2023/08* (2013.01); *B29K 2033/04* (2013.01); *B29K 2077/00* (2013.01); *B29K 2081/04* (2013.01); *B29K 2105/0085* (2013.01); *B29K 2105/0088* (2013.01); *B29K 2105/0097* (2013.01)

(58) Field of Classification Search

CPC ........... B29K 2033/04; B29K 2077/00; B29K 2081/04; B29K 2105/0085; B29K 2105/0088; B29K 2105/0097; F16L 11/06; B32B 7/12; B32B 27/00; B32B 27/08

See application file for complete search history.

(56) References Cited

FOREIGN PATENT DOCUMENTS

| | | | |
|---|---|---|---|
| JP | 11-228827 | A | 8/1999 |
| JP | 2008-87168 | A | 4/2008 |
| JP | 2008-213458 | A | 9/2008 |
| KR | 10-2010-0131489 | A | 12/2010 |
| WO | WO 2018/003700 | A1 | 1/2018 |

OTHER PUBLICATIONS

Extended European Search Report for European Application No. 22889601.5, dated Sep. 15, 2025.

International Preliminary Report on Patentability and Written Opinion of the International Searching Authority for International Application No. PCT/JP2022/019171, dated May 16, 2024, with an English translation.

International Search Report for International Application No. PCT/JP2022/019171, dated Jul. 26, 2022, with an English translation.

* cited by examiner

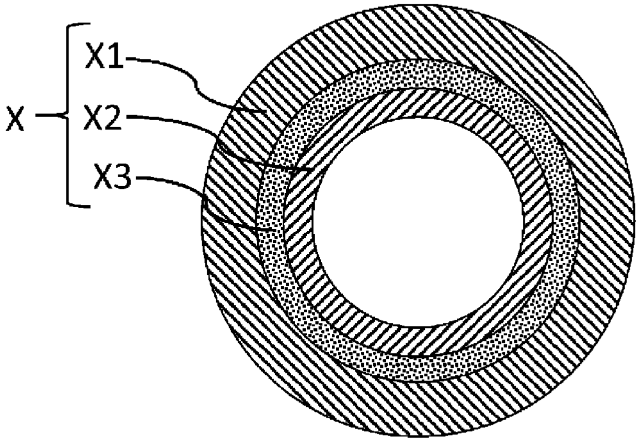
X
X1
X2
X3

RESIN COMPOSITION FOR ADHESIVE LAYER, AND MULTILAYER TUBE

TECHNICAL FIELD

The present disclosure relates to a resin composition for an adhesive layer, and a multilayer tube.

BACKGROUND ART

In the related art, multilayer tubes in which three or more layers are layered have been used as automobile components and the like.

A known example of the multilayer tube includes a multilayer tube including a first layer made of a resin composition for a first layer, the resin composition containing a polyamide resin; a second layer made of a resin composition for a second layer, the resin composition containing a polyphenylene sulfide-based resin; and an adhesive layer that is arranged in between the first layer and the second layer and that bonds the first layer and the second layer (e.g., Patent Document 1).

The adhesive layer is made of a resin composition for an adhesive layer.

In Patent Document 1, the resin composition for an adhesive layer contains a polyphenylene sulfide-based resin (A), a polyamide resin (B), a first thermoplastic resin (C) containing at least one type of functional group selected from the group consisting of an epoxy group, an acid anhydride group, a carboxyl group, a carboxylic acid salt, and a carboxylic acid ester, and a second thermoplastic resin (D) containing no epoxy group, no acid anhydride group, no carboxyl group, no carboxylic acid salt, and no carboxylic acid ester.

Furthermore, in Patent Document 1, the resin composition for an adhesive layer contains, with respect to 100 parts by weight of the polyphenylene sulfide-based resin (A), from 80 to 300 parts by weight of the polyamide resin (B), from 20 to 200 parts by weight of the first thermoplastic resin (C), and from 10 to 100 parts by weight of the second thermoplastic resin (D).

Because the multilayer tube contains the second layer containing the polyphenylene sulfide-based resin, the multilayer tube becomes a tube having excellent heat resistance, hot water resistance, chemical resistance, flame retardancy, electrical properties, and the like.

Furthermore, because the multilayer tube contains the first layer containing the polyamide resin, the multilayer tube becomes a tube having excellent mechanical properties and the like.

Furthermore, because the multilayer tube contains the adhesive layer, adhesiveness to the first layer and the second layer increases, and the functions of the first layer and the second layer are readily exhibited.

The multilayer tube can be formed by coextrusion of molten materials each prepared by melting each of the resin composition for a first layer, the resin composition for a second layer, and the resin composition for an adhesive layer.

CITATION LIST

Patent Literature

Patent Document 1: JP 2008-213458 A

SUMMARY OF INVENTION

Technical Problem

Note that, if the adhesive layer has a thin part, for example, such a part may cause reduction of adhesiveness to the first layer and the second layer.

On the other hand, if the adhesive layer has a thick part, for example, volume proportions of the first layer and the second layer in the entire multilayer tube become smaller, and characteristics by the first layer and the second layer may not be sufficiently exhibited.

Variation in the thickness of the adhesive layer is thus preferably small.

However, sufficient study has not been conducted for a resin composition for an adhesive layer, the resin composition readily suppressing variation in thickness of an adhesive layer at the time of formation of the adhesive layer from a resin composition for an adhesive layer by melt extrusion molding.

An object of the present disclosure is to provide a resin composition for an adhesive layer, the resin composition readily suppressing variation in thickness of an adhesive layer at the time of formation of the adhesive layer from a resin composition for an adhesive layer by melt extrusion molding; and a multilayer tube having less variation in thickness of an adhesive layer.

Solution to Problem

A first aspect of the present disclosure relates to a resin composition for an adhesive layer. The resin composition contains:

a polyphenylene sulfide-based resin (A);

a polyamide resin (B);

a first thermoplastic resin (C) containing at least one type of functional group selected from the group consisting of an epoxy group, an acid anhydride group, a carboxyl group, a carboxylic acid salt, and a carboxylic acid ester; and a second thermoplastic resin (D) that is free of epoxy groups, acid anhydride groups, carboxyl groups, carboxylic acid salts, and carboxylic acid esters. The resin composition contains, with respect to 100 parts by weight of the polyphenylene sulfide-based resin (A), from 80 to 300 parts by weight of the polyamide resin (B), from 20 to 200 parts by weight of the first thermoplastic resin (C), and from 10 to 100 parts by weight of the second thermoplastic resin (D). A terminal amino group concentration of the polyamide resin (B) is from 48 to 120 mmol/kg.

A melt mass-flow rate at 230° C. of the polyamide resin (B) is preferably from 1 to 50 g/10 min.

The polyamide resin (B) preferably contains at least one of polyamide 11 or polyamide 12.

The resin composition for an adhesive layer preferably has a matrix-domain structure including matrix and a domain, the polyamide resin (B) is preferably contained in the matrix, and the polyphenylene sulfide-based resin (A) is preferably contained in the domain.

A second aspect of the present disclosure relates to a multilayer tube in which three or more layers are layered. The multilayer tube includes:

- a first layer containing a polyamide resin;
- a second layer arranged in an inner periphery side of the multilayer tube with respect to the first layer and containing a polyphenylene sulfide-based resin; and
- an adhesive layer arranged in between the first layer and the second layer and bonding the first layer and the second layer. The adhesive layer contains the resin composition for an adhesive layer described above.

The polyamide resin in the first layer preferably contains at least one of polyamide 11 or polyamide 12.

The second layer preferably further contains an epoxy-modified thermoplastic resin, and the second layer preferably contains, with respect to 100 parts by weight of the polyphenylene sulfide-based resin, from 1 to 50 parts by weight of the epoxy-modified thermoplastic resin.

Advantageous Effects of Invention

According to the present disclosure, variation in thickness of an adhesive layer can be suppressed at the time of formation of the adhesive layer from a resin composition for an adhesive layer by melt extrusion molding.

BRIEF DESCRIPTION OF DRAWINGS

FIG. 1 is a schematic cross-sectional view of a multilayer tube according to the present embodiment.

DESCRIPTION OF EMBODIMENTS

An embodiment according to the present disclosure will be described below with reference to the accompanying drawings.

It should be noted that the respective configurations and the combinations thereof in the respective embodiments are only examples, and the configurations may be added, omitted, substituted, or otherwise modified as appropriate within a scope that does not depart from the spirit of the present disclosure. The present disclosure is not limited by the embodiments and is limited only by the claims.

Each aspect disclosed in the present specification can be combined with any other feature disclosed herein.

Resin Composition for Adhesive Layer According to the Present Embodiment

The resin composition for an adhesive layer according to the present embodiment contains a polyphenylene sulfide-based resin (A), a polyamide resin (B), a first thermoplastic resin (C) containing at least one type of functional group selected from the group consisting of an epoxy group, an acid anhydride group, a carboxyl group, a carboxylic acid salt, and a carboxylic acid ester, and a second thermoplastic resin (D) that is free of epoxy groups, acid anhydride groups, carboxyl groups, carboxylic acid salts, and carboxylic acid esters.

Furthermore, the resin composition for an adhesive layer according to the present embodiment contains, with respect to 100 parts by weight of the polyphenylene sulfide-based resin (A), from 80 to 300 parts by weight of the polyamide resin (B), from 20 to 200 parts by weight of the first thermoplastic resin (C), and from 10 to 100 parts by weight of the second thermoplastic resin (D).

The terminal amino group concentration of the polyamide resin (B) is from 48 to 120 mmol/kg.

The resin composition for an adhesive layer according to the present embodiment is used to produce a multilayer tube.

The multilayer tube is a multilayer tube in which three or more layers are layered.

Furthermore, the multilayer tube includes: a first layer containing a polyamide resin; a second layer arranged in an inner periphery side of the multilayer tube with respect to the first layer and containing a polyphenylene sulfide-based resin; and an adhesive layer arranged in between the first layer and the second layer and bonding the first layer and the second layer.

The adhesive layer is made of the resin composition for an adhesive layer according to the present embodiment.

The resin composition for an adhesive layer according to the present embodiment preferably has a matrix-domain structure including matrix and a domain. Furthermore, the polyamide resin (B) is preferably contained in the matrix, and the polyphenylene sulfide-based resin (A) is preferably contained in the domain. "The polyamide resin (B) contained in the matrix" means that "a greater amount of the polyamide resin (B) is contained in the matrix than in the domain". Furthermore, "the polyphenylene sulfide-based resin (A) is contained in the domain" means that "a greater amount of the polyphenylene sulfide-based resin (A) is contained in the domain than in the matrix".

In the resin composition for an adhesive layer according to the present embodiment, when the polyphenylene sulfide-based resin (A) is contained in the domain, the particle size of the domain can be made small and the surface area of the domain can be made large. As a result, the resin composition for an adhesive layer according to the present embodiment can firmly adhere to the first layer and the second layer.

Polyphenylene Sulfide-Based Resin (A)

The polyphenylene sulfide-based resin (A) is a polymer containing a unit represented by Formula (1).

[Chem. 1]

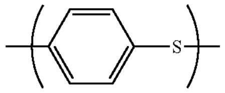

(1)

Furthermore, the polyphenylene sulfide-based resin (A) may contain a unit other than the unit represented by Formula (1).

Examples of the unit other than the unit represented by Formula (1) include units represented by Formulas (2) to (8).

[Chem. 2]

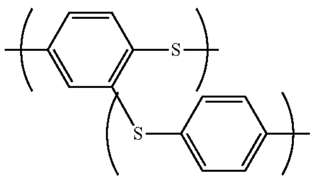

(2)

[Chem. 3]

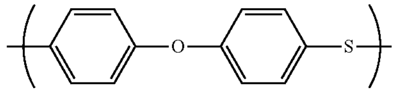

(3)

-continued

[Chem. 4]

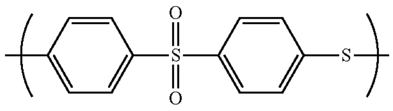

(4)

[Chem. 5]

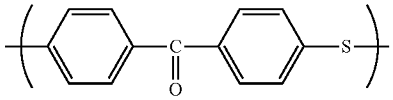

(5)

[Chem. 6]

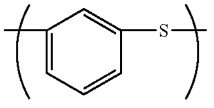

(6)

[Chem. 7]

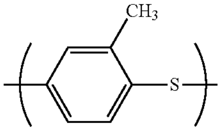

(7)

[Chem. 8]

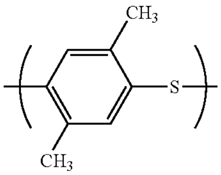

(8)

From the viewpoint of heat resistance, the polyphenylene sulfide-based resin (A) contains preferably 70 mol % or greater, and more preferably 90 mol % or greater, of the repeating unit represented by Formula (1).

Examples of the polyphenylene sulfide-based resin (A) include a polyphenylene sulfide-based resin that has a relatively small molecular weight and that is obtained by a production method such as a method of JP 45-3368 B; and a polyphenylene sulfide-based resin that is substantially linear, that has a relatively high molecular weight, and that is obtained by a production method such as a method of JP 52-12240 B.

Furthermore, an example of the polyphenylene sulfide-based resin (A) that may be used includes a polyphenylene sulfide-based resin that is obtained by highly polymerizing a polyphenylene sulfide-based resin obtained by the method described in JP 45-3368 B by heating in an oxygen atmosphere.

Furthermore, another example of the polyphenylene sulfide-based resin (A) that may be used includes a polyphenylene sulfide-based resin that is obtained by adding a crosslinking agent (e.g., peroxide) to a polyphenylene sulfide-based resin obtained by the method described in JP 45-3368 B and then highly polymerizing the mixture by heating.

Note that, in the present embodiment, a polyphenylene sulfide-based resin obtained by any method can be used as the polyphenylene sulfide-based resin (A); however, a polyphenylene sulfide-based resin that is substantially linear and that has a relatively high molecular weight is suitably used.

Furthermore, the polyphenylene sulfide-based resin (A) is preferably a deionized polyphenylene sulfide-based resin.

A deionized polyphenylene sulfide-based resin can be obtained by washing a polyphenylene sulfide-based resin with an acid solution or an organic solvent.

Examples of the washing method include a method of soaking a polyphenylene sulfide-based resin in an acid solution or an organic solvent. In addition, in a state where the polyphenylene sulfide-based resin is soaked in the acid solution or the organic solvent, the acid solution or the organic solvent may be agitated. In addition, in a state where the polyphenylene sulfide-based resin is soaked in the acid solution or the organic solvent, the acid solution or the organic solvent may be heated.

To reduce an acid or salt remained on a polyphenylene sulfide-based resin washed with an acid solution, the polyphenylene sulfide-based resin washed with the acid solution is preferably washed with water (e.g., warm water).

Water used for washing to suppress deterioration of the effect of the deionization is preferably distilled water or deionized water.

The acid contained in the acid solution is not particularly limited as long as the acid does not have an action of decomposing the polyphenylene sulfide-based resin, and examples thereof include acetic acid, hydrochloric acid, sulfuric acid, phosphoric acid, silicic acid, carbonic acid, and propyl acid. The acid is preferably acetic acid or hydrochloric acid.

Note that, as the acid, an acid that decomposes the polyphenylene sulfide-based resin (e.g., nitric acid) is not preferred.

For example, in a case where acetic acid is used as the acid contained in the acid solution, a polyphenylene sulfide-based resin can be adequately deionized by soaking a powder of the polyphenylene sulfide-based resin in an acid solution adjusted to approximately pH 4 and heated to 80 to 90° C. and agitating for 30 minutes or longer.

The organic solvent used for washing of the polyphenylene sulfide-based resin is not particularly limited as long as the organic solvent does not have an action of decomposing the polyphenylene sulfide-based resin, and examples thereof include a nitrogen-containing polar solvent (e.g., N-methylpyrrolidone, dimethylformamide, dimethylacetamide, 1,3-dimethylimidazolidinone, hexamethylphosphoramide, and piperazinones), a sulfoxide (e.g., dimethylsulfoxide), a sulfone (e.g., dimethyl sulfone, sulfolane), a ketone-based solvent (e.g., acetone, methyl ethyl ketone, diethyl ketone, and acetophenone), an ether-based solvent (e.g., dimethyl ether, dipropyl ether, dioxane, and tetrahydrofuran), a halogen-based solvent (e.g., chloroform, methylene chloride, trichloroethylene, ethylene dichloride, perchloroethylene, monochloroethane, dichloroethane, tetrachloroethane, perchloroethane, and chlorobenzene), an alcohol (e.g., methanol, ethanol, propanol, butanol, pentanol, ethylene glycol, propylene glycol, polyethylene glycol, and polypropylene glycol), a phenol-based solvent (e.g., phenol and cresol), and an aromatic hydrocarbon (e.g., benzene, toluene, and xylene).

One type of these organic solvents may be used alone, or two or more types of these organic solvents may be used.

Among these organic solvents, N-methylpyrrolidone, acetone, dimethylformamide, and chloroform are preferred.

The washing temperature during washing of the polyphenylene sulfide-based resin with the organic solvent is not particularly limited, and a freely chosen temperature approximately from room temperature (e.g., 25° C.) to 300° C. can be employed. Note that, washing efficiency tends to be higher as the washing temperature is higher; however, adequate effect can be achieved typically at a washing temperature of room temperature to 150° C.

Furthermore, when the polyphenylene sulfide-based resin is washed with the organic solvent, the polyphenylene sulfide-based resin may be washed in a pressure vessel at a temperature that is not lower than the boiling point of the organic solvent while pressure is applied.

Furthermore, the washing time is not particularly limited. Although it also depends on the washing conditions, adequate effect can be achieved by typically washing for 5 minutes or longer in a case of batch-wise washing. Furthermore, the washing can be performed in a continuous manner.

To reduce the organic solvent remained on a polyphenylene sulfide-based resin washed with the organic solvent, the polyphenylene sulfide-based resin washed with the organic solvent is preferably washed with water (e.g., warm water).

Water used for washing to suppress deterioration of the effect of the deionization is preferably distilled water or deionized water.

From the viewpoint of facilitating reduction of the organic solvent remained on the polyphenylene sulfide-based resin by washing with water, the organic solvent is preferably a water-soluble organic solvent having a high boiling point (e.g., N-methylpyrrolidone).

Furthermore, the polyphenylene sulfide-based resin (A) is preferably a modified polyphenylene sulfide-based resin (A). Examples of the modified polyphenylene sulfide-based resin (A) include a polyphenylene sulfide-based resin treated with hot water.

The temperature of the hot water is preferably 100° C. or higher, more preferably 120° C. or higher, even more preferably 150° C. or higher, and particularly preferably 170° C. or higher.

Furthermore, the hot water is preferably distilled water or deionized water.

Furthermore, in the hot water treatment, to suppress decomposition of a terminal group of the polyphenylene sulfide-based resin, the hot water treatment is preferably performed in an inert atmosphere.

The hot water treatment is performed by agitation while the polyphenylene sulfide-based resin and water are heated in a pressure vessel. In the hot water treatment, in 1 L of water at room temperature, the amount of the polyphenylene sulfide-based resin is preferably 200 g or less.

Furthermore, to remove a component remained in the polyphenylene sulfide-based resin after the hot water treatment, the polyphenylene sulfide-based resin after the hot water treatment is preferably washed with warm water.

As the polyphenylene sulfide-based resin (A), a polyphenylene sulfide-based resin (A) having any melt viscosity can be used as long as the polyphenylene sulfide-based resin (A) can be melt-kneaded with another material constituting the resin composition for an adhesive layer according to the present embodiment.

From the viewpoint of increasing moldability of the resin composition for an adhesive layer according to the present embodiment and from the viewpoint of facilitating formation of a matrix-domain structure of the resin composition for an adhesive layer according to the present embodiment, a melt mass-flow rate (MFR) at 315.5° C. of the polyphenylene sulfide-based resin (A) is preferably from 20 to 600 g/10 min, and more preferably from 100 to 300 g/10 min.

Note that the melt mass-flow rate (MFR) at 315.5° C. of the polyphenylene sulfide-based resin (A) is measured by a method described in ASTM-D1238-70.

The melt mass-flow rate (MFR) at 315.5° C. of the polyphenylene sulfide-based resin (A) is measured in such a manner that 5 g of the polyphenylene sulfide-based resin (A) is dried, the dried polyphenylene sulfide-based resin (A) is heated at 315.5° C. for 5 minutes, and then 5000 g of load is applied to the heated polyphenylene sulfide-based resin (A).

Polyamide Resin (B)

Examples of a component constituting the polyamide resin (B) include amino acid, lactam, diamine, and dicarboxylic acid.

Examples of the amino acid include 6-aminocaproic acid, 11-aminoundecanoic acid, 12-aminododecanoic acid, and p-aminomethylbenzoic acid.

Examples of the lactam include &-caprolactam and @-laurolactam.

Examples of the diamine include an aliphatic diamine, an alicyclic diamine, and an aromatic diamine. More specific examples of the diamine include pentamethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bis(aminomethyl) cyclohexane, 1,4-bis(aminomethyl)cyclohexane, 1-amino-3-aminomethyl-3,5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethylpiperazine.

Examples of the dicarboxylic acid include aliphatic dicarboxylic acid, alicyclic dicarboxylic acid, and aromatic dicarboxylic acid. More specific examples of the dicarboxylic acid include adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sodiumsulfoisophthalic acid, 2,6-naphthalenedicarboxylic acid, hexahydroterephthalic acid, and hexahydroisophthalic acid.

In the present disclosure, a nylon homopolymer or copolymer derived from these raw materials can be used alone or in a form of a mixture.

From the viewpoint of forming a polyamide resin having excellent heat resistance (melting point: 150° C. or higher) or from the viewpoint of forming a polyamide resin having excellent strength, examples of the polyamide resin (B) include polycaproamide (polyamide 6), polyhexamethylene adipamide (polyamide 66), polypentamethylene adipamide (polyamide 56), polyhexamethylene sebacamide (polyamide 610), polyhexamethylene dodecamide (polyamide 612), polyundecaneamide (polyamide 11), polydodecaneamide (polyamide 12), a polycaproamide/polyhexamethylene adipamide copolymer (polyamide 6/66), a polycaproamide/polyhexamethylene terephthalamide copolymer (polyamide 6/6T), a polyhexamethylene adipamide/polyhexamethylene terephthalamide copolymer (polyamide 66/6T), a polyhexamethylene adipamide/polyhexamethylene isophthalamide copolymer (polyamide 66/6I), a polyhexamethylene terephthalamide/polyhexamethylene isophthalamide copolymer (polyamide 6T/6I), a polyhexamethylene terephthalamide/polydodecaneamide copolymer (polyamide 6T/12), a polyhexamethylene adipamide/polyhexamethylene terephthalamide/polyhexamethylene isophthalamide copolymer (polyamide 66/6T/6I), polyxylylene adipamide (polyamide MXD6), a polyhexamethylene terephthalamide/poly-2-methylpentamethylene terephthalamide copolymer (polyamide 6T/M5T), polynonamethylene terephthalamide (polyamide 9T), polyamide 46, polyamide 1010, polyamide 1012, polyamide MXD10, polyamide 10T, polyamide 10T/11, polyamide 10T/12, and a mixture of these.

From the viewpoints of moldability, mechanical characteristic, and the like, as the polyamide resin (B), polyamide 11 and polyamide 12 are preferred.

A terminal amino group concentration of the polyamide resin (B) is from 48 to 120 mmol/kg, preferably from 50 to 115 mmol/kg, and more preferably from 52 to 110 mmol/kg.

When the terminal amino group concentration of the polyamide resin (B) is 48 mmol/kg or greater, variation in the thickness of the adhesive layer can be readily suppressed.

It is presumed that, when the terminal amino group concentration of the polyamide resin (B) is 48 mmol/kg or greater, an amine terminal group in the polyamide resin (B) and a functional group in the first thermoplastic resin (C) are readily reacted, and miscibility between the polyamide resin (B) and the first thermoplastic resin (C) is readily increased. It is thus presumed that, when the resin composition for an adhesive layer is melt-extruded, the resin composition for an adhesive layer is readily extruded in a relatively uniform thickness, and thus variation in the thickness of the adhesive layer tends to be suppressed.

When the terminal amino group concentration of the polyamide resin (B) is 120 mmol/kg or less, variation in the thickness of the adhesive layer can be readily suppressed.

It is presumed that, when the terminal amino group concentration of the polyamide resin (B) is 120 mmol/kg or less, the molecular weight of the polyamide resin (B) tends to be large, and a viscosity of the resin composition for an adhesive layer tends to be high. It is thus presumed that, when the resin composition for an adhesive layer is melt-extruded, the shape of the extruded resin composition for an adhesive layer tends to be maintained, and thus variation in thickness of the adhesive layer tends to be suppressed.

Furthermore, a ratio of the terminal amino group concentration to the terminal carboxyl group concentration (terminal amino group concentration/terminal carboxyl group concentration) in the polyamide resin (B) is preferably from 1 to 20, more preferably from 2 to 10, and even more preferably from 2 to 5.

When the ratio of the terminal amino group concentration to the terminal carboxyl group concentration (terminal amino group concentration/terminal carboxyl group concentration) in the polyamide resin (B) is in a range of 1 to 20, in the resin composition for an adhesive layer according to the present embodiment, the particle size of the domain containing the polyphenylene sulfide-based resin (A) can be made even smaller, and the surface area of the domain can be made even larger. As a result, the resin composition for an adhesive layer according to the present embodiment can further firmly adhere to the first layer and the second layer.

Note that the terminal amino group concentration of the polyamide resin (B) can be determined as described below.

First, phenol and ethanol are mixed in a volume ratio of 9:1 to prepare a phenol/ethanol solvent.

Then, a weighed polyamide resin (B) is dissolved in 40 mL of the phenol/ethanol solvent to obtain a first solution.

Then, 10 mL of ethanol is added to the first solution to obtain a second solution.

Then, the second solution is titrated with N/100 hydrochloric acid solution to determine the terminal amino group concentration of the polyamide resin (B).

Note that the terminal amino group concentration of the polyamide resin can be increased by, for example, reacting the carboxyl group of the polyamide resin and a diamine compound.

Examples of the diamine compound include 1,12-dodecanediamine.

Furthermore, the terminal carboxyl group concentration of the polyamide resin (B) can be determined as described below.

First, a weighed polyamide resin (B) is dissolved in 50 mL of benzyl alcohol in an oil bath at 180° C. to obtain a solution.

Then, using phenolphthalein as an indicator, the solution is titrated with N/100 potassium hydroxide-ethanol solution to determine the terminal carboxyl group concentration of the polyamide resin (B).

A melt mass-flow rate (MFR) at 230° C. of the polyamide resin (B) is preferably from 1 to 50 g/10 min, more preferably from 1 to 25 g/10 min, and even more preferably from 1 to 10 g/10 min.

When the melt mass-flow rate (MFR) at 230° C. of the polyamide resin (B) is 1 g/10 min or greater, the resin composition for an adhesive layer according to the present embodiment tends to flow when melted, and as a result, molding of the resin composition is facilitated.

When the melt mass-flow rate (MFR) at 230° C. of the polyamide resin (B) is 50 g/10 min or less, in a case where the resin composition for an adhesive layer according to the present embodiment is melted and discharged from a die of an extruder, a discharge pressure tends to be adequately applied, and the variation in the thickness of the adhesive layer tends to be further suppressed.

Note that the melt mass-flow rate (MFR) at 230° C. of the polyamide resin (B) is measured by a method described in ASTM-D1238-70.

The melt mass-flow rate (MFR) at 230° C. of the polyamide resin (B) is measured in such a manner that 5 g of the polyamide resin (B) is dried, the dried polyamide resin (B) at 230° C. for 5 minutes is heated, and then 2160 g of load is applied to the heated polyamide resin (B).

The resin composition for an adhesive layer according to the present embodiment contains from 80 to 300 parts by weight, and preferably from 100 to 250 parts by weight, of the polyamide resin (B) with respect to 100 parts by weight of the polyphenylene sulfide-based resin (A).

When the resin composition for an adhesive layer according to the present embodiment contains 80 parts by weight or greater of the polyamide resin (B) with respect to 100 parts by weight of the polyphenylene sulfide-based resin (A), adhesiveness to the first layer containing the polyamide resin can be increased.

When the resin composition for an adhesive layer according to the present embodiment contains 300 parts by weight or less of the polyamide resin (B) with respect to 100 parts by weight of the polyphenylene sulfide-based resin (A), adhesiveness to the second layer containing the polyphenylene sulfide-based resin can be increased.

First Thermoplastic Resin (C)

The first thermoplastic resin (C) is a thermoplastic resin containing at least one type of functional group selected from the group consisting of an epoxy group, an acid anhydride group, a carboxyl group, a carboxylic acid salt, and a carboxylic acid ester.

Examples of the first thermoplastic resin (C) include a polyolefin-based copolymer containing the functional group and a fluorine-based copolymer containing the functional group.

Examples of the polyolefin-based resin include an epoxy group-containing polyolefin-based copolymer (C1) and an acid anhydride group-containing polyolefin-based copolymer (C2).

The epoxy group-containing polyolefin-based copolymer (C1) is an olefin-based copolymer containing an epoxy group in a side chain or a main chain. Note that the epoxy group-containing polyolefin-based resin (C1) does not include an epoxy resin.

Examples of the olefin-based copolymer containing an epoxy group in a side chain or a main chain include an olefin-based copolymer containing a glycidyl group in a side chain or a main chain.

Examples of the olefin-based copolymer containing a glycidyl group in a side chain or a main chain include a glycidyl ester-type olefin-based copolymer, a glycidyl ether-type olefin-based copolymer, and a glycidyl amine-type olefin-based copolymer. Furthermore, preferable examples of the olefin-based copolymer containing a glycidyl group include a copolymer of α-olefin and a glycidyl ester of α,β-unsaturated acid.

Examples of the α-olefin include ethylene, propylene, and butene-1.

Note that the glycidyl ester of α,β-unsaturated acid is a compound represented by Formula (9).

[Chem. 9]

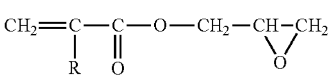

(9)

However, R in Formula (9) represents any one of a hydrogen atom or an alkyl group having from 1 to 6 carbons.

Examples of the glycidyl ester of α,β-unsaturated acid include glycidyl acrylate, glycidyl methacrylate, and glycidyl ethacrylate. Among these, glycidyl methacrylate is particularly preferred.

The copolymer of the α-olefin and the glycidyl ester of α,β-unsaturated acid may be a random copolymer, a block copolymer, or a graft copolymer.

Furthermore, examples of the olefin-based copolymer containing an epoxy group in a side chain or a main chain also includes a material obtained by subjecting a double bond of a double bond-containing olefin-based copolymer to epoxy oxidation.

The epoxy group-containing polyolefin-based copolymer (C1) may contain, for example, methyl acrylate, methyl methacrylate, acrylonitrile, styrene, vinyl acetate, and vinyl ether as a constituent unit.

The content of the epoxy group in the epoxy group-containing polyolefin-based copolymer (C1) is preferably from 1 to 50 wt. %, and more preferably from 3 to 40 wt. %.

When the content of the epoxy group in the epoxy group-containing polyolefin-based copolymer (C1) is 1 wt. % or greater, the resin composition for an adhesive layer according to the present embodiment tends to have the matrix-domain structure, and as a result, the resin composition for an adhesive layer can firmly adhere to the first layer and the second layer.

When the content of the epoxy group in the epoxy group-containing polyolefin-based copolymer (C1) is 50 wt. % or less, gel is less likely to be formed when the epoxy group-containing polyolefin-based copolymer (C1) and the polyphenylene sulfide-based resin are melt-kneaded, and as a result, excellent extrusion stability and moldability of the resin composition for an adhesive layer according to the present embodiment are achieved, and mechanical strength of the resin composition for an adhesive layer according to the present embodiment tends to be increased.

The acid anhydride group-containing polyolefin-based copolymer (C2) is a polyolefin-based copolymer modified with an acid anhydride.

Examples of the polyolefin-based copolymer before modification with the acid anhydride include an ethylene-propylene copolymer, an ethylene-butene copolymer, polybutene, an ethylene-propylene-diene copolymer, a styrene-butadiene copolymer, polybutadiene, a butadiene-acrylonitrile copolymer, polyisoprene, a butene-isoprene copolymer, and a styrene-ethylene-butadiene-styrene copolymer.

Furthermore, the polyolefin-based copolymer before modification with the acid anhydride may be a copolymer of the listed polyolefin-based copolymers, polyethylene, polypropylene, or polystyrene, and another monomer.

Examples of such another monomer include acrylic acid, methacrylic acid, vinyl acetate, methyl acrylate, methyl methacrylate, methyl acrylate, methyl methacrylate, ethyl acrylate, ethyl methacrylate, propyl acrylate, propyl methacrylate, butyl acrylate, and butyl methacrylate. Furthermore, examples of such another monomer include a salt of vinyl acetate and a metal (e.g., Na, Zn, K, Ca, or Mg).

Examples of the acid anhydride include maleic anhydride, succinic anhydride, and fumaric anhydride.

The acid anhydride group-containing polyolefin-based copolymer (C2) may be a random copolymer, a graft copolymer, a block copolymer, or the like.

The resin composition for an adhesive layer according to the present embodiment contains from 20 to 200 parts by weight, and preferably from 30 to 150 parts by weight, of the first thermoplastic resin (C) with respect to 100 parts by weight of the polyphenylene sulfide-based resin (A).

When the resin composition for an adhesive layer according to the present embodiment contains 20 parts by weight or greater of the first thermoplastic resin (C) with respect to 100 parts by weight of the polyphenylene sulfide-based resin (A), the melt viscosity of the resin composition for an adhesive layer increases, and excellent moldability is achieved. Furthermore, impact resistance of the resin composition for an adhesive layer according to the present embodiment is also increased due to the configuration described above.

When the resin composition for an adhesive layer according to the present embodiment contains 200 parts by weight or less of the first thermoplastic resin (C) with respect to 100 parts by weight of the polyphenylene sulfide-based resin (A), gel is less likely to be formed at the time of melt-kneading with the polyphenylene sulfide-based resin (A), and as a result, excellent extrusion stability, moldability, mechanical strength, and heat resistance are achieved.

One type of the first thermoplastic resin (C) may be used alone, or two or more types of the first thermoplastic resins (C) may be used.

Furthermore, the first thermoplastic resin (C) preferably contains the epoxy group-containing polyolefin-based resin (C1) and the acid anhydride group-containing polyolefin-based resin (C2).

A ratio of the weight of the acid anhydride group-containing polyolefin-based resin (C2) to the weight of the epoxy group-containing polyolefin-based resin (C1) is preferably from 1/10 to 10/1, and more preferably from 1/5 to 10/1.

Note that the first thermoplastic resin (C) does not include either the polyphenylene sulfide-based resin (A) or the polyamide resin (B).

Second Thermoplastic Resin (D)

Examples of the second thermoplastic resin (D) that is free of epoxy groups, acid anhydride groups, carboxyl groups, carboxylic acid salts, and carboxylic acid esters include a polyolefin-based resin, a diene-based resin, a hydrogenated product of a diene-based resin, and an acrylic resin.

Examples of the polyolefin-based resin include an ethylene-propylene copolymer, an ethylene-butene copolymer, polybutene, an ethylene-propylene-diene copolymer, and an ethylene-vinyl acetate copolymer.

Examples of the diene-based resin include a styrene-butadiene copolymer, polybutadiene, a butadiene-acrylonitrile copolymer, polyisoprene, and a butene-isoprene copolymer.

Examples of the acrylic resin include an ethylene-methyl acrylate copolymer, an ethylene-ethyl acrylate copolymer, an ethylene-isopropyl acrylate copolymer, an ethylene-methyl methacrylate copolymer, and an ethylene-ethyl methacrylate copolymer.

As the second thermoplastic resin (D), one type of these may be used alone, or a combination of two or more types of these may be used.

As the second thermoplastic resin (D), an ethylene-propylene copolymer, an ethylene-butene copolymer, and an ethylene-propylene-diene copolymer are preferred.

The resin composition for an adhesive layer according to the present embodiment contains from 10 to 100 parts by weight, and preferably from 15 to 80 parts by weight, of the second thermoplastic resin (D) with respect to 100 parts by weight of the polyphenylene sulfide-based resin (A).

When the resin composition for an adhesive layer according to the present embodiment contains 10 parts by weight or greater of the second thermoplastic resin (D) with respect to 100 parts by weight of the polyphenylene sulfide-based resin (A), excellent impact resistance at low temperatures is achieved.

Furthermore, when the resin composition for an adhesive layer according to the present embodiment contains 100 parts by weight or less of the second thermoplastic resin (D) with respect to 100 parts by weight of the polyphenylene sulfide-based resin (A), the second thermoplastic resin (D) has excellent miscibility with another material.

Note that the second thermoplastic resin (D) does not include the polyphenylene sulfide-based resin (A) and/or the polyamide resin (B).

Additive

The resin composition for an adhesive layer according to the present embodiment may further contain an additive.

Examples of the additive include a nucleating agent, a releasing agent, an antioxidant, a heat stabilizer, a lubricant, a UV blocking agent, a coloring agent, and a flame retardant.

Method for Producing Resin Composition for Adhesive Layer According to the Present Embodiment Examples of the method for producing a resin composition for an adhesive layer according to the present embodiment include a method in which a raw material is fed to a melting and mixing device and melt-kneaded at a temperature of 280 to 340° C.

Examples of the melting and mixing device include an extruder, a Banbury mixer, a kneader, and a mixing roll. Examples of the extruder include a single-screw extruder and a twin-screw extruder.

From the viewpoint of increasing impact resistance, especially impact resistance at low temperatures, by increasing desired reactivity between the first thermoplastic resin (C) and the polyphenylene sulfide-based resin (A) or the polyamide resin (B), the method for preparing the resin composition for an adhesive layer according to the present embodiment is preferably a two-step extrusion method, in which pellets for a polyphenylene sulfide-based resin (A) part and pellets for a polyamide resin (B) part are prepared by separately extruding the polyphenylene sulfide-based resin (A) part and the polyamide resin (B) part, and then a polyphenylene sulfide-based resin (A) and a polyamide resin (B) are alloyed by using the pellets for the polyphenylene sulfide-based resin (A) part and the pellets for the polyamide resin (B) part.

Furthermore, from the similar viewpoint, as the method for preparing the resin composition for an adhesive layer according to the present embodiment, a side-feed extrusion method, in which the polyphenylene sulfide-based resin (A) part is fed to an extruder from a hopper of the extruder and the polyamide resin (B) is fed to the extruder from a middle of a cylinder of the extruder, is also preferred.

In the two-step extrusion method, a polyphenylene sulfide-based resin (A) and a second thermoplastic resin (D) are fed to a twin-screw extruder from a hopper of the twin-screw extruder and melt-kneaded at a resin temperature of 280° C. to 340° C., and thus pellets of the polyphenylene sulfide-based resin (A) part are obtained (first step).

Then, the pellets for the polyphenylene sulfide-based resin (A) part and a polyamide resin (B) are fed to the twin-screw extruder from a hopper of the twin-screw extruder and melt-kneaded at a resin temperature of 280° C. to 340° C., and thus resin composition for an adhesive layer according to the present embodiment is obtained (second step).

Note that, for the first thermoplastic resin (C), a portion thereof may be fed in the first step, and the rest may be fed in the second step. Furthermore, the entire amount of the first thermoplastic resin (C) may be fed in the first step. Furthermore, the entire amount of the first thermoplastic resin (C) may be fed in the second step. Furthermore, in the second step, pellets obtained by melt-kneading the polyamide resin (B) and the first thermoplastic resin (C) in advance may be used.

In the side-feed extrusion method, a polyphenylene sulfide-based resin (A) and a second thermoplastic resin (D) are fed to a twin-screw extruder from a back hopper of the twin-screw extruder, a polyamide resin (B) is fed to the twin-screw extruder from a side feeder (arranged in a middle of a cylinder) of the twin-screw extruder, and these are melt-kneaded at a resin temperature of 280° C. to 340° C., and thus resin composition for an adhesive layer according to the present embodiment is obtained.

Note that, for the first thermoplastic resin (C), a portion thereof may be fed in the twin-screw extruder from a back hopper of the twin-screw extruder, and the rest may be fed to the twin-screw extruder from the side feeder of the twin-screw extruder in the second step. Furthermore, the entire amount of the first thermoplastic resin (C) may be fed to the twin-screw extruder from the back hopper of the twin-screw extruder. Furthermore, the entire amount of the first thermoplastic resin (C) may be fed to the twin-screw extruder from the side feeder of the twin-screw extruder.

Note that, from the viewpoint of readily obtaining excellent resin composition for an adhesive layer, the method for producing the resin composition for an adhesive layer according to the present embodiment is preferably the two-step extrusion method.

From the viewpoint of economical advantage, the method for producing the resin composition for an adhesive layer according to the present embodiment is preferably the side-feed extrusion method.

Multilayer Tube According to the Present Embodiment

The multilayer tube according to the present embodiment will be described below with reference to the drawings.

As illustrated in FIG. 1, a multilayer tube X according to the present embodiment is a multilayer tube in which three layers are layered.

Furthermore, the multilayer tube X according to the present embodiment includes: a first layer X1 containing a polyamide resin; a second layer X2 arranged in an inner periphery side of the multilayer tube with respect to the first layer X1 and containing a polyphenylene sulfide-based resin; and an adhesive layer X3 arranged in between the first layer X1 and the second layer X2 and bonding the first layer X1 and the second layer X2.

Note that the first layer X1 is adhering to the adhesive layer X3 with no layer interposed therebetween. In other words, the first layer X1 is directly adhering to the adhesive layer X3.

In addition, the first layer X2 is adhering to the adhesive layer X3 with no layer interposed therebetween. In other words, the first layer X2 is directly adhering to the adhesive layer X3.

The multilayer tube according to the present disclosure is only required to be a multilayer tube in which three or more layers are layered, and for example, the multilayer tube may have a four-layer structure or a five-layer structure.

Adhesive Layer X3

The adhesive layer X3 is a layer made of the resin composition for an adhesive layer according to the present embodiment.

Second Layer X2

The second layer X2 contains a polyphenylene sulfide-based resin.

Furthermore, the second layer X2 is made of a resin composition for a second layer.

The resin composition for a second layer contains a polyphenylene sulfide-based resin.

Furthermore, from the viewpoint of improving melt tension of the resin composition for a second layer, the resin composition for a second layer preferably contains an epoxy-modified thermoplastic resin. By improvement of the melt tension of the resin composition for a second layer, drawability of the resin composition for a second layer is improved in tube formation of the resin composition for a second layer. Furthermore, by improvement of the melt tension of the resin composition for a second layer, draw-down property of the resin composition for a second layer is improved in blow molding of the resin composition for a second layer.

Furthermore, the resin composition for a second layer may further contain an unmodified polyolefin-based resin as necessary.

Examples of the polyphenylene sulfide-based resin in the resin composition for a second layer include a polyphenylene sulfide-based resin described above as the polyphenylene sulfide-based resin (A) in the resin composition for an adhesive layer according to the present embodiment. The polyphenylene sulfide-based resin in the resin composition for a second layer may be the same as or different from the polyphenylene sulfide-based resin (A) in the resin composition for an adhesive layer according to the present embodiment.

The resin composition for a second layer further contains the epoxy-modified thermoplastic resin, and the resin composition for a second layer contains preferably from 1 to 50 parts by weight, and more preferably from 5 to 40 parts by weight, of the epoxy-modified thermoplastic resin with respect to 100 parts by weight of the polyphenylene sulfide-based resin. In other words, the second layer further contains the epoxy-modified thermoplastic resin, and the second layer contains preferably from 1 to 50 parts by weight, and more preferably from 5 to 40 parts by weight, of the epoxy-modified thermoplastic resin with respect to 100 parts by weight of the polyphenylene sulfide-based resin.

When the resin composition for a second layer contains 1 part by weight or greater of the epoxy-modified thermoplastic resin with respect to 100 parts by weight of the polyphenylene sulfide-based resin, improving effect of impact resistance of the second layer tends to be exhibited.

When the resin composition for a second layer contains 50 parts by weight or less of the epoxy-modified thermoplastic resin with respect to 100 parts by weight of the polyphenylene sulfide-based resin, gel is less likely to be formed at the time of melt-kneading of the polyphenylene sulfide-based resin and the epoxy-modified thermoplastic resin, and melt-kneading is facilitated.

Examples of the epoxy-modified thermoplastic resin include an olefin-based copolymer containing an epoxy group in a side chain or a main chain.

Examples of the olefin-based copolymer containing an epoxy group include an olefin-based copolymer containing a glycidyl group.

Examples of the olefin-based copolymer containing a glycidyl group include a glycidyl ester-type olefin-based copolymer, a glycidyl ether-type olefin-based copolymer, and a glycidyl amine-type olefin-based copolymer.

Furthermore, preferable examples of the olefin-based copolymer containing a glycidyl group include a copolymer of α-olefin and a glycidyl ester of α,β-unsaturated acid.

Examples of the α-olefin include ethylene, propylene, and butene-1.

Note that the glycidyl ester of α,β-unsaturated acid is a compound represented by Formula (9).

[Chem. 10]

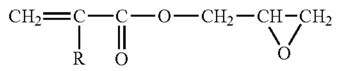

(9)

However, R in Formula (9) represents any one of a hydrogen atom or an alkyl group having from 1 to 6 carbons.

Examples of the glycidyl ester of α,β-unsaturated acid include glycidyl acrylate, glycidyl methacrylate, and glycidyl ethacrylate. Among these, glycidyl methacrylate is particularly preferred.

The copolymer of the α-olefin and the glycidyl ester of α,β-unsaturated acid may be a random copolymer, a block copolymer, or a graft copolymer.

Furthermore, examples of the olefin-based copolymer containing an epoxy group in a side chain or a main chain also includes a material obtained by subjecting a double bond of a double bond-containing olefin-based copolymer to epoxy oxidation.

Examples of the unmodified polyolefin-based resin include polyethylene (e.g., high-density polyethylene, medium-density polyethylene, low-density polyethylene), polypropylene, an ethylene-propylene copolymer, an ethylene-butene copolymer, polybutene, an ethylene-propylene-diene copolymer, and an ethylene-vinyl acetate copolymer.

Furthermore, the unmodified polyolefin-based resin may be a diene-based resin, a hydrogenated product of a diene-based resin, and an acrylic resin.

Examples of the diene-based resin include a styrene-butadiene copolymer, polybutadiene, a butadiene-acrylonitrile copolymer, polyisoprene butene-isoprene copolymer.

Examples of the acrylic resin include an ethylene-methyl acrylate copolymer, an ethylene-ethyl acrylate copolymer, an ethylene-isopropyl acrylate copolymer, an ethylene-methyl methacrylate copolymer, and an ethylene-methyl methacrylate copolymer.

In a case where a chemical is circulated in the multilayer tube of the present embodiment, arranging the second layer X2 containing the polyphenylene sulfide-based resin in the inner periphery side of the multilayer tube with respect to the first layer X1 makes the chemical resistance against the chemical of the multilayer tube X excellent.

Note that the second layer X2 contains the polyphenylene sulfide-based resin in an amount greater than that in the adhesive layer X3.

Method for Producing Resin Composition for Second Layer

Examples of the method for producing a resin composition for a second layer include a method in which a raw material is fed to a melting and mixing device and melt-kneaded at a temperature of 280 to 340° C.

Examples of the melting and mixing device include an extruder, a Banbury mixer, a kneader, and a mixing roll. Examples of the extruder include a single-screw extruder and a twin-screw extruder.

From the viewpoint of increasing reactivity with the polyphenylene sulfide-based resin and the epoxy-modified thermoplastic resin, a twin-screw extruder is preferably used as the extruder.

First Layer X1

The first layer X1 contains a polyamide resin.

Furthermore, the first layer X1 is made of a resin composition for a first layer.

The resin composition for a first layer contains a polyamide resin.

Furthermore, the resin composition for a first layer may contain at least one of another thermoplastic resin, a plasticizer, or a stabilizer as necessary.

Examples of the polyamide resin in the first layer X1 include a polyamide resin described above as the polyamide resin (B) in the resin composition for an adhesive layer according to the present embodiment.

The polyamide resin in the first layer X1 may be the same as or different from the polyamide resin (B) in the resin composition for an adhesive layer according to the present embodiment.

The polyamide resin contained in the first layer X1 preferably contains at least one of polyamide 11 or polyamide 12 from the viewpoints of dimensional stability, chemical resistance, and impact resistance.

Note that the first layer X1 contains the polyamide resin in an amount greater than that in the adhesive layer X3.

Method for Producing Resin Composition for First Layer

Examples of the method for producing a resin composition for a first layer include a method in which a raw material is fed to a melting and mixing device and melt-kneaded at a temperature of 180 to 300° C.

Examples of the melting and mixing device include an extruder, a Banbury mixer, a kneader, and a mixing roll. Examples of the extruder include a single-screw extruder and a twin-screw extruder.

The flexural modulus of the multilayer tube according to the present embodiment is preferably 2.0 GPa or less from the viewpoint of excellent flexibility and from the viewpoint of excellent processability at the time of bending work.

Note that the flexural modulus of the multilayer tube according to the present embodiment is a value measured by forming a Type A1 specimen stipulated in ISO 20753 from each resin composition and performing bending test in accordance with ISO 178.

Note that, when the resin composition for an adhesive layer according to the present embodiment is melt-kneaded by a twin-screw extruder, dispersibility of the first thermoplastic resin (C) can be increased, and as a result, the flexural modulus of the multilayer tube according to the present embodiment can be increased.

Method for Producing Multilayer Tube

Examples of the method for producing a multilayer tube according to the present embodiment include a coextrusion method.

In the method for producing the multilayer tube according to the present embodiment, first, a resin composition for an adhesive layer, a resin composition for a first layer, and a resin composition for a second layer are fed to separate extruders, and each of molten resins of these is obtained.

Then, the molten resins are extruded from the extruders into one die to merge the molten resins in the die. Furthermore, the molten resins are coextruded to the outside of the die, and thus a multilayer tube according to the present embodiment can be obtained.

The multilayer tube according to the present embodiment can be obtained by a known tube molding method or a blow molding method.

Use of Multilayer Tube

The multilayer tube according to the present embodiment has excellent heat resistance, hot water resistance, chemical resistance, gas permeability resistance, and flexibility.

The multilayer tube according to the present embodiment can be used as a tube for transporting, for example, a fuel (e.g., gasoline), water (e.g., coolant), or a chemical.

In addition, the multilayer tube according to the present embodiment can be used as an electrical component or an electronic component.

Disclosure Item

Each of the following items is disclosure of a preferred embodiment.

Item 1

A resin composition for an adhesive layer, the resin composition containing:

- a polyphenylene sulfide-based resin (A);
- a polyamide resin (B);
- a first thermoplastic resin (C) containing at least one type of functional group selected from the group consisting of an epoxy group, an acid anhydride group, a carboxyl group, a carboxylic acid salt, and a carboxylic acid ester; and
- a second thermoplastic resin (D) that is free of epoxy groups, acid anhydride groups, carboxyl groups, carboxylic acid salts, and carboxylic acid esters, wherein the resin composition contains, with respect to 100 parts by weight of the polyphenylene sulfide-based resin (A), from 80 to 300 parts by weight of the polyamide resin (B), from 20 to 200 parts by weight of the first thermoplastic resin (C), and from 10 to 100 parts by weight of the second thermoplastic resin (D), and a terminal amino group concentration of the polyamide resin (B) is from 48 to 120 mmol/kg.

Item 2

The resin composition for an adhesive layer according to Item 1, wherein a melt mass-flow rate at 230° C. of the polyamide resin (B) is from 1 to 50 g/10 min.

Item 3

The resin composition for an adhesive layer according to Item 1 or 2, wherein the polyamide resin (B) contains at least one of polyamide 11 or polyamide 12.

Item 4

The resin composition for adhesive layer according to any one of Items 1 to 3, wherein the resin composition has a matrix-domain structure including matrix and a domain, the polyamide resin (B) is contained in the matrix, and the polyphenylene sulfide-based resin (A) is contained in the domain.

Item 5

A multilayer tube in which three or more layers are layered, the multilayer tube including:

a first layer containing a polyamide resin;

a second layer arranged in an inner periphery side of the multilayer tube with respect to the first layer and containing a polyphenylene sulfide-based resin; and an adhesive layer arranged in between the first layer and the second layer and bonding the first layer and the second layer, the adhesive layer is made of the resin composition for an adhesive layer according to any one of Items 1 to 4.

Item 6

The multilayer tube according to Item 5, wherein the polyamide resin in the first layer contains at least one of polyamide 11 or polyamide 12.

Item 7

The multilayer tube according to Item 5 or 6, wherein the second layer further contains an epoxy-modified thermoplastic resin, and the second layer further contains, with respect to 100 parts by weight of the polyphenylene sulfide-based resin, from 1 to 50 parts by weight of the epoxy-modified thermoplastic resin.

EXAMPLES

Next, the present disclosure will be described more specifically with reference to an example and comparative examples. Note that the present disclosure is not to be considered limited to these examples at all.

Resin Composition for Adhesive Layer

First, to prepare each resin composition for an adhesive layer of Examples and Comparative Examples, the polyphenylene sulfide-based resin (A) described below, the polyamide resin (B) described below, the first thermoplastic resin (C) described below, the second thermoplastic resin (D) described below, and an antioxidant (F) were prepared as raw materials.

Polyphenylene Sulfide-Based Resin (A)

Polyphenylene Sulfide-Based Resin (A-1)

A first autoclave was prepared. The first autoclave included a first reaction vessel, a first agitator to agitate the content in the first reaction vessel, and a bottom valve to open and close the first reaction vessel.

Next, in the first reaction vessel, 8.27 kg of 47.5 wt. % sodium hydrosulfide (sodium hydrosulfide: 70.00 mol), 2.91 kg of 96 wt. % sodium hydroxide (sodium hydroxide: 69.80 mol), 11.45 kg (115.50 mol) of N-methyl-2-pyrrolidone (NMP), 2.24 kg (27.3 mol) of sodium acetate, and 10.5 kg of ion exchanged water were charged.

Then, while a nitrogen gas was blown into the first reaction vessel at normal pressure, inside of the first reaction vessel was gradually heated for approximately 3 hours to make the temperature of the content in the first reaction vessel 245° C. As a result, from the first reaction vessel, 14.78 kg of water and 0.28 kg of N-methyl-2-pyrrolidone (NMP) were distilled.

Thereafter, the content of the first reaction vessel was cooled to 200° C. The amount of water content remained in the first reaction vessel per 1 mol of the alkali metal sulfide (sodium hydrosulfide) charged in the first reaction vessel (including water content consumed in the hydrolysis of N-methyl-2-pyrrolidone (NMP)) was 1.06 mol. Furthermore, the amount of the hydrogen sulfide emitted outside of the first reaction vessel was 0.02 mol per 1 mol of the alkali metal sulfide (sodium hydrosulfide) charged in the first reaction vessel.

In the first reaction vessel, 10.34 kg (70.32 mol) of p-dichlorobenzene and 9.37 kg (94.50 mol) of NMP were then charged, and the first reaction vessel was sealed in a nitrogen gas.

While the content in the first reaction vessel was agitated by the first agitator at 240 rpm, the temperature of the content in the first reaction vessel was increased from 200° C. to 235° C. at a rate of 0.8° C./min.

Then, while the content in the first reaction vessel was agitated by the first agitator at 240 rpm, the content was heated at 235° C. for 40 minutes, and thus the content was reacted.

Thereafter, while the content was agitated by the agitator at 240 rpm, the temperature of the content was increased from 235° C. to 270° C. at a rate of 0.8° C./min.

Then, while the content was agitated by the agitator at 240 rpm, the content was heated at 270° C. for 70 minutes, and thus the content was reacted.

Then, while the content in the first reaction vessel was agitated by the first agitator, the inside of the first reaction vessel was subjected to pressure application with a nitrogen gas for 15 minutes in a condition where the bottom valve was opened, to perform flash distillation.

Thereafter, the content inside the first reaction vessel was agitated for a while at 250° C. by the agitator. By this, the major portion of the N-methyl-2-pyrrolidone (NMP) was removed from the content inside the first reaction vessel, and thus a first solid material was obtained.

A second autoclave was prepared. The second autoclave included a second reaction vessel and a second agitator to agitate the content in the second reaction vessel.

Next, the first solid material and 76 L of ion exchanged water were charged in the second reaction vessel.

Then, while the content in the second reaction vessel was agitated by the second agitator at 70° C. for 30 minutes, the first solid material was washed with ion exchanged water.

Thereafter, the content of the second reaction vessel was vacuum filtered by a glass filter, and thus a second solid material was obtained.

Then, 76 L of ion exchanged water at 70° C. was poured into the second solid material on the glass filter, the second solid material and the ion exchanged water were vacuum filtered, and thus a third solid material was obtained.

A third autoclave was prepared. The third autoclave included a third reaction vessel and a second agitator to agitate the content in the third reaction vessel.

Next, the third solid material and 90 L of ion exchanged water were charged in the third reaction vessel.

Then, the air in the third reaction vessel was purged with a nitrogen gas.

The temperature of the content in the third reaction vessel was then increased to 192° C., and the content was heated at 192° C. for 30 minutes.

Then, the third reaction vessel was cooled, and the content in the third reaction vessel was taken out.

The content was then vacuum filtered by a glass filter, and thus a fourth solid material was obtained.

Then, 76 L of ion exchanged water at 70° C. was poured into the fourth solid material on the glass filter, the fourth solid material and the ion exchanged water were vacuum filtered, and thus a fifth solid material was obtained.

The fifth solid material was dried at 120° C. in a nitrogen gas stream, and thus a polyphenylene sulfide-based resin (A-1) was obtained.

The melt mass-flow rate (MFR) at 315.5° C. of the polyphenylene sulfide-based resin (A-1) was 230 g/10 min.

Note that the melt mass-flow rate (MFR) at 315.5° C. of the polyphenylene sulfide-based resin (A-1) was measured by the method described above.

Polyamide Resin (B)

B-1: Polyamide 12 (available from Daicel-Evonik Ltd.) (terminal amino group concentration: 52 mmol/kg; terminal amino group concentration/terminal carboxyl group concentration: 2.74; melt mass-flow rate (MFR) (temperature: 230° C.; load: 2160 kg): 3 g/10 min)

B-2: Polyamide 12 (available from Daicel-Evonik Ltd.) (terminal amino group concentration: 64 mmol/kg; terminal amino group concentration/terminal carboxyl group concentration: 3.37; melt mass-flow rate (MFR) (temperature: 230° C.; load: 2160 kg): 8 g/10 min)

B-3: Polyamide 12 (available from Daicel-Evonik Ltd.) (terminal amino group concentration: 5 mmol/kg; terminal amino group concentration/terminal carboxyl group concentration: 0.07; melt mass-flow rate (MFR) (temperature: 230° C.; load: 2160 kg): 8 g/10 min)

B-4: Polyamide 12 (available from Arkema S.A.; trade name: Rilsamid; model: AESNOTL) (terminal amino group concentration: 29 mmol/kg; terminal amino group concentration/terminal carboxyl group concentration: 0.78; melt mass-flow rate (MFR) (temperature: 230° C.; load: 2160 kg): 5 g/10 min)

Note that the terminal amino group concentration, the terminal amino group concentration/terminal carboxyl group concentration, and the melt mass-flow rate (MFR) of the polyamide resin (B) were measured by the methods described above.

Furthermore, for the following polyamide resins, the terminal amino group concentration and the terminal amino group concentration/terminal carboxyl group concentration were measured.

B-5: Polyamide 11 (available from Arkema S.A.; trade name: Rilsan; model: BESNOTL) (terminal amino group concentration: 38 mmol/kg; terminal amino group concentration/terminal carboxyl group concentration: 0.38)

B-6: Polyamide 6 ("AMILAN", available from Toray Industries, Inc.) (terminal amino group concentration: 46 mmol/kg; terminal amino group concentration/terminal carboxyl group concentration: 0.82)

Thus, the polyamides used in Examples of JP 2008-213458 A (B-4 to B-6 in the present specification) (B-1 to B-3 of JP 2008-213458 A) had the terminal amino group concentrations of 46 mmol/kg or less.

First Thermoplastic Resin (C) Containing at Least One Type of Functional Group Selected from Group Consisting of Epoxy Group, Acid Anhydride Group, Carboxyl Group, Carboxylic Acid Salt, and Carboxylic Acid Ester C-1: Copolymer of ethylene and glycidyl methacrylate ("Bondfast" E, available from Sumitomo Chemical Co., Ltd.)

C-2: Copolymer of acid-modified ethylene and 1-butene ("TAFMER" MH5020, available from Mitsui Chemicals, Inc.)

Second Thermoplastic Resin (D) That Is Free of Epoxy Group, Acid Anhydride Group, Carboxyl Group, Carboxylic Acid Salt, and Carboxylic Acid Ester D-1: Ethylene-1-butene copolymer ("TAFMER" A4085S, available from Mitsui Chemicals, Inc.)

Antioxidant (F)

F-1: Tetrakis-[methylene-3-(3',5'-di-t-butyl-4-hydroxyphenyl) propionate]methane

Examples 1-1 and 1-2 and Comparative Examples 1-1 to 1-4

Pellets of a resin composition for an adhesive layer were obtained by a two-step extrusion method.

First, as a first step, raw materials of the first step listed in Table 1 below were dry-blended and subjected to 2 minutes of preliminary mixing in a tumbler, and thus a first preliminary mixture was obtained.

Then, the first preliminary mixture was melt-kneaded in a twin-screw extruder (a set temperature of cylinder in a range from 280° C. to 320° C.), and thus first pellets were obtained.

Then, as a second step, raw materials of the second step listed in Table 1 below and the first pellets were dry-blended and subjected to 2 minutes of preliminary mixing in a tumbler, and thus a second preliminary mixture was obtained.

Thereafter, the second preliminary mixture was melt-kneaded in a twin-screw extruder (set temperature of cylinder in a range from 280° C. to 320° C.), and thus pellets of a resin composition for an adhesive layer were obtained.

Example 1-3: Dry Blending in Batch

Raw materials listed in Table 1 below were dry-blended in a batch and subjected to 2 minutes of preliminary mixing in a tumbler, and thus a preliminary mixture was obtained.

Then, the preliminary mixture was melt-kneaded in a twin-screw extruder (set temperature of cylinder in a range from 280° C. to 320° C.), and thus pellets of a resin composition for an adhesive layer were obtained.

Melt Mass-Flow Rate (MFR) of Resin Composition for Adhesive Layer

The melt mass-flow rate (MFR) at 315.5° C. of the resin composition for an adhesive layer was measured by a method described in ASTM-D1238-70.

The melt mass-flow rate (MFR) at 315.5° C. of the resin composition for an adhesive layer was measured in such a manner that 5 g of the pellets of the resin composition for an adhesive layer were dried, the dried pellets A) of the resin composition for an adhesive layer were heated at 315.5° C. for 5 minutes, and then 5000 g of load was applied to the heated pellets of the resin composition for an adhesive layer.

The measured value is shown in Table 1 below.

Terminal Amino Group Concentration in Resin Composition for Adhesive Layer and Terminal Amino Group Concentration/Terminal Carboxyl Group Concentration The terminal amino group concentration and the terminal carboxyl group concentration in the resin composition for an adhesive layer were measured. The terminal amino group concentration/terminal carboxyl group concentration in the resin composition for an adhesive layer was then calculated.

Note that the terminal amino group concentration in the resin composition for an adhesive layer was determined as described below.

First, phenol and ethanol were mixed in a volume ratio of 9:1 to prepare a phenol/ethanol solvent.

Then, a weighed resin composition for an adhesive layer was dissolved in 40 mL of the phenol/ethanol solvent, and thus a first solution was obtained.

Then, 10 mL of ethanol was added to the first solution, and thus a second solution was obtained.

Then, the second solution was titrated with N/100 hydrochloric acid solution to determine the terminal amino group concentration of the resin composition for an adhesive layer.

Furthermore, the terminal carboxyl group concentration in the resin composition for an adhesive layer was determined as described below.

First, a weighed resin composition for an adhesive layer was dissolved in 50 mL of benzyl alcohol in an oil bath at 180° C., and a solution was obtained.

Then, using phenolphthalein as an indicator, the solution was titrated with N/100 potassium hydroxide-ethanol solution to determine the terminal carboxyl group concentration of the resin composition for an adhesive layer.

The terminal amino group concentration and the terminal amino group concentration/terminal carboxyl group concentration in the resin composition for an adhesive layer are shown in Table 1 below.

Preparation of Test Piece

The pellets of the resin composition for an adhesive layer of each of Examples and Comparative Examples were dried at 130° C. for 3 hours by using a hot air drier.

Then, the dried pellets of the resin composition for an adhesive layer were fed to an injection molding machine (SE-50D) available from Sumitomo Heavy Industries, Ltd. (cylinder temperature: 320° C.; mold temperature: 145° C.), and the pellets of the resin composition for an adhesive layer were injection-molded by using a mold having a shape of a Type A1 specimen stipulated in ISO 20753. Thus, a test piece was obtained.

Note that, in injection molding, injection molding was performed in a condition that made the average speed of the molten resin 400±50 mm/s, and thus a test piece in a dumbbell shape was obtained.

Note that, in Comparative Example 1, a test piece with the dumbbell shape could not be obtained because gas bubbles were formed in the molten resin at the time of the injection molding.

The result is indicated in Table 1 below.

Tensile Strength and Tensile Elongation

Tensile strength and tensile elongation of the resin composition for an adhesive layer were measured by using the test piece in accordance with ISO 527-1 and -2.

Specifically, the condition of the test piece was adjusted by placing the test piece at a temperature of 23° C. and a relative humidity of 50% for 16 hours. Then, using the test piece having undergone the condition adjustment, the flexural modulus of the resin composition for an adhesive layer was measured in the following conditions in accordance with ISO 527-1 and -2.

Temperature of measurement environment: 23° C.

Relative humidity of measurement environment: 50%

Distance between grips: 114 mm

Test speed: 50 mm/s

The result is indicated in Table 1 below.

Flexural Modulus

Flexural modulus of the resin composition for an adhesive layer was measured by using the test piece in accordance with ISO 178.

Specifically, a Type B2 specimen was obtained by cutting out a central part of the test piece. Then, the condition of the Type B2 specimen was adjusted by placing the specimen at a temperature of 23° C. and a relative humidity of 50% for 16 hours. Then, using the Type B2 specimen having undergone the condition adjustment, the flexural modulus of the resin composition for an adhesive layer was measured in the following conditions in accordance with ISO 178.

Temperature of measurement environment: 23° C.

Relative humidity of measurement environment: 50%

Span: 64 mm

Test speed: 2 mm/s

The result is indicated in Table 1 below.

Charpy Impact Strength (notched)

Charpy impact strength (notched) of the resin composition for an adhesive layer were measured by using the specimen in accordance with ISO 179-1.

Specifically, a notched test piece (length: 80 mm; width of notch: 4 mm) was obtained by cutting out a central part of the specimen and forming a notch. Then, the condition of the notched test piece was adjusted by placing the specimen at a temperature of 23° C. and a relative humidity of 50% for 16 hours. Then, using the notched test piece having undergone the condition adjustment, the Charpy impact strength (notched) of the resin composition for an adhesive layer was measured in the following conditions in accordance with ISO 179-1.

Temperature of measurement environment: 23° C.

Relative humidity of measurement environment: 50%

The result is indicated in Table 1 below.

TABLE 1

| | | | | Example 1-1 | Example 1-2 | Example 1-3 | Comparative Example 1-1 | Comparative Example 1-2 | Comparative Example 1-3 | Comparative Example 1-4 |
|---|---|---|---|---|---|---|---|---|---|---|
| Resin composition for adhesive layer | Blending proportion (part by weight) | Polyphenylene sulfide-based resin (A) | A-1 | 100 | 100 | 100 | 100 | 100 | 100 | 100 |
| | | Polyamide resin (B) | B-1 (terminal amino group concentration: 52 mmol/kg) | 160 | | 160 | | | | |
| | | | B-2 (terminal amino group concentration: 64 mmol/kg) | | 160 | | | | | |
| | | | B-3 (terminal amino group concentration: 5 mmol/kg) | | | | 160 | | | |
| | | | B-4 (terminal amino group concentration: 29 mmol/kg) | | | | | 160 | | |
| | | | B-5 (terminal amino group concentration: 38 mmol/kg) | | | | | | 160 | |
| | | | B-6 (terminal amino group concentration: 46 mmol/kg) | | | | | | | 160 |
| | | First thermoplastic resin (C) | C-1 | 10 | 10 | 10 | 10 | 10 | 10 | 10 |
| | | | C-2 | 25 | 25 | 25 | 25 | 25 | 25 | 25 |
| | | Second thermoplastic resin (D) | D-1 | 30 | 30 | 30 | 30 | 30 | 30 | 30 |
| | | Antioxidant | F-1 | 1 | 1 | 1 | 1 | 1 | 1 | 1 |
| | Materials fed in first step and second step of two-step extrusion method | | First step | A-1 C-1 D-1 | A-1 C-1 D-1 | — | A-1 C-1 D-1 | A-1 C-1 D-1 | A-1 C-1 D-1 | A-1 C-1 D-1 |
| | | | Second step | C-2 B-1 F-1 | C-2 B-2 F-1 | | C-2 B-3 F-1 | C-2 B-4 F-1 | C-2 B-5 F-1 | C-2 B-6 F-1 |
| | MFR at 315.5° C. (g/10 min) | | | 1 | 7 | 3 | >100 | 4 | 19 | 19 |
| | Terminal amino group concentration (mmol/kg) | | | 25 | 39 | Not measured | 16 | 3 | 47 | 32 |
| | Terminal amino group concentration/terminal carboxyl group concentration (—) | | | 2.78 | 19.50 | Not measured | 0.57 | 0.25 | 1.38 | 2.13 |
| | Mechanical Properties | | Tensile strength (MPa) | 49 | 45 | 50 | Not measured because molding was impossible. | 43 | 36 | 48 |
| | | | Tensile elongation (%) | 213 | 202 | 105 | | 206 | 115 | 43 |
| | | | Flexural modulus (GPa) | 1.3 | 1.2 | 1.4 | | 0.9 | 1.0 | 1.7 |
| | | | Charpy impact strength ($kJ/m^2$) | 108 | 80 | 62 | | 86 | 73 | 63 |

Unlike Comparative Example 1-1, in Examples 1-1 to 1-3, test pieces were obtained. It is presumed that, because the MFRs of Examples 1-1 to 1-3 were low, the test pieces were obtained.

As shown in Table 1 above, Examples 1-1 to 1-3 each had a higher flexural modulus compared to those of Comparative Examples 1-2 and 1-3. Note that, in Comparative Example 1-1, it was not possible to obtain a test piece, and the measurement of the flexural modulus was not possible.

Example 1-1 employing the two step extrusion method achieved a higher tensile elongation and a higher Charpy impact strength compared to those of Example 1-3, in which the raw materials were kneaded in a batch.

Multilayer Tube

To prepare a multilayer tube of each of Examples and Comparative Examples, as raw materials, besides the pellets of the resin compositions for adhesive layers of Examples 1-1 and 1-2 and Comparative Examples 1-1 to 1-4, the resin composition for a first layer described below and the pellets of the resin composition for a second layer described below were prepared.

Resin Composition for First Layer

As the resin composition for a first layer, high-viscosity, plasticizer-free polyamide 12 ("VESTAMID" LX9008 Black, available from Daicel-Evonik Ltd.) was prepared.

Resin Composition for Second Layer

To prepare the resin composition for a second layer, the following raw materials were prepared.

Polyphenylene Sulfide-Based Resin

An autoclave was prepared. The autoclave included a reaction vessel, an agitator to agitate the content in the reaction vessel, and a bottom valve to open and close the first reaction vessel.

Next, in the reaction vessel, 8.27 kg of 47.5 wt. % sodium hydrosulfide (sodium hydrosulfide: 70.00 mol), 2.94 kg of 96 wt. % sodium hydroxide (sodium hydroxide: 70.63 mol), 11.45 kg (115.50 mol) of N-methyl-2-pyrrolidone (NMP), 1.89 kg (23.1 mol) of sodium acetate, and 5.50 kg of ion exchanged water were charged.

Then, while a nitrogen gas was blown into the reaction vessel at normal pressure, inside of the reaction vessel was gradually heated for approximately 3 hours to make the temperature of the content in the reaction vessel 245° C. As a result, from the reaction vessel, 9.77 kg of water and 0.28 kg of N-methyl-2-pyrrolidone (NMP) were distilled.

Thereafter, the content of the reaction vessel was cooled to 200° C. The amount of water content remained in the reaction vessel per 1 mol of the alkali metal sulfide (sodium hydrosulfide) charged in the reaction vessel (including water content consumed in the hydrolysis of N-methyl-2-pyrrolidone (NMP)) was 1.06 mol. Furthermore, the amount of the hydrogen sulfide emitted outside of the reaction vessel was 0.02 mol per 1 mol of the alkali metal sulfide (sodium hydrosulfide) charged in the reaction vessel.

In the reaction vessel, 10.42 kg (70.86 mol) of p-dichlorobenzene and 9.37 kg (94.50 mol) of NMP were then charged, and the reaction vessel was sealed in a nitrogen gas.

While the content in the reaction vessel was agitated by the agitator at 240 rpm, the temperature of the content in the reaction vessel was increased from 200° C. to 270° C. at a rate of 0.6° C./min.

Then, while the content in the reaction vessel was agitated by the agitator at 240 rpm, the content was heated at 270° C. for 140 minutes, and thus the content was reacted.

Thereafter, while the content in the reaction vessel was cooled from 270° C. to 250° C. over 15 minutes, 2.40 kg (133 mol) of water was injected into the reaction vessel.

The content in the reaction vessel was then cooled from 250° C. to 220° C. over 75 minutes.

The content in the reaction vessel was then rapidly cooled from 220° C. to approximately room temperature, and the content was taken out.

Thereafter, the content was diluted with approximately 35 L of N-methyl-2-pyrrolidone (NMP), and thus a first slurry was obtained. The first slurry was agitated at 85° C. for 30 minutes and then filtered by an 80 mesh screen (opening: 0.175 mm), and thus a first solid material was obtained.

The first solid material was then diluted with approximately 35 L of N-methyl-2-pyrrolidone (NMP), and thus a second slurry was obtained. The second slurry was agitated at 85° C. for 30 minutes and then filtered by an 80 mesh screen, and thus a second solid material was obtained.

The second solid material was then diluted with 70 L of ion exchanged water, and thus a third slurry was obtained. The third slurry was agitated at 70° C. for 30 minutes and then filtered by an 80 mesh screen (washing by ion exchanged water).

The washing by the ion exchanged water was performed two more times, and thus a third solid material was obtained.

The third solid material was then diluted with 32 g of acetic acid and 70 L of ion exchanged water, and thus a fourth slurry was obtained. The fourth slurry was agitated at 70° C. for 30 minutes and then filtered by an 80 mesh screen, and thus a fourth solid material was obtained.

The fourth solid material was then diluted with 70 L of ion exchanged water, and thus a fifth slurry was obtained. The fifth slurry was agitated at 70° C. for 30 minutes and then filtered by an 80 mesh screen, and thus a fifth solid material was obtained.

The fifth solid material was dried at 120° C. in a nitrogen gas stream, and thus a polyphenylene sulfide-based resin was obtained.

The melt mass-flow rate (MFR) at 315.5° C. of the polyphenylene sulfide-based resin was 300 g/10 min.

Note that the melt mass-flow rate (MFR) at 315.5° C. of the polyphenylene sulfide-based resin was measured by the method described above.

Epoxy-Modified Thermoplastic Resin

As the epoxy-modified thermoplastic resin, a copolymer of ethylene and glycidyl methacrylate was prepared.

Other

As other materials, a copolymer of ethylene and 1-butene and a high density polyethylene were prepared.

The polyphenylene sulfide-based resin, the copolymer of ethylene and glycidyl methacrylate, the copolymer of ethylene and 1-butene, and the high density polyethylene were dry-blended and subjected to 2 minutes of preliminary mixing in a tumbler, and thus a preliminary mixture was obtained.

Then, the preliminary mixture was melt-kneaded in a twin-screw extruder (set temperature of cylinder in a range from 280° C. to 320° C.) and pelletized by a strand cutter, and thus pellets of a resin composition for a second layer were obtained.

Note that the resin composition for a second layer contained, with respect to 100 parts by weight of the polyphenylene sulfide-based resin, 15 parts by weight of the copolymer of ethylene and glycidyl methacrylate, 15 parts by weight of the copolymer of ethylene and 1-butene, and 5 parts by weight of the high density polyethylene.

The flexural modulus of the resin composition for a second layer was 1.8 GPa.

The flexural modulus of the resin composition for a second layer was measured by a method same as the method for the flexural modulus of the resin composition for an adhesive layer.

Examples 2-1 and 2-2 and Comparative Examples 2-1 to 2-4

The resin composition for a first layer was charged in an extruder for a 50 mm outer layer (temperature was adjusted to 260° C.), the pellets of the resin composition for an adhesive layer of each of Examples 1-1 and 1-2 and Comparative Examples 1-1 to 1-4 were charged in an extruder for a 25 mm adhesive layer (temperature was adjusted to 320° C.), and pellets of the composition for a second layer were charged in an extruder for a 40 mm inner layer (temperature was adjusted to 310° C.).

Then, each of the resin compositions were melt-kneaded in the inner part of each of the extruders. The resin compositions were then respectively fed to a coextrusion die (temperature was adjusted to 290° C.) from the extruders. The resin compositions were melt-joined in a multi layer form in a joining part of the coextrusion die. The resin compositions were coextruded from a die face at a tip of the coextrusion die as a three-layered parison.

The discharge pressure of the resin composition for an adhesive layer at the time of the coextrusion molding was measured. The discharge pressure is shown in Table 2 below.

The parison with three layers were cooled and solidified by sizing apparatus, and thus a three-layer tube (outer diameter: 8 mm; inner diameter: 6 mm) was obtained. The drawing rate of the parison with three layers was 15 m/min.

The three-layer tube had a three layer structure of an outer layer, an inner layer arranged in the inner periphery side relative to the outer layer, and an adhesive layer arranged in between the outer layer and the inner layer.

The outer layer was made of the resin composition for a first layer. The thickness of the outer layer was approximately 0.7 mm.

The inner layer was made of the resin composition for a second layer. The thickness of the inner layer was approximately 0.2 mm.

The adhesive layer was made of the resin composition for an adhesive layer. The thickness of the adhesive layer was approximately 0.1 mm.

The three-layer tube of each of Examples 2-1 and 2-2 and Comparative Examples 2-1 to 2-4 was a three-layer tube made by using the pellets of the resin composition for an adhesive layer of each of Examples 1-1 and 1-2 and Comparative Examples 1-1 to 1-4.

Domain Size

The three-layer tube of each of Examples and Comparative Examples was cut perpendicular to a length direction.

Then, an image of the cross section of the three-layer tube was taken by a scanning electron microscope (SEM), and the domain size in the image (magnification: 1000 times) was observed and evaluated based on the following criteria.

○: Case where the domain size was 50 μm or less.

Δ: Case where the domain size was greater than 50 μm and 200 μm or less.

x: Case where the domain size was greater than 200 μm.

The results are shown in Table 2 below.

Tensile Test

A tensile test was performed for the three-layer tube of each of Examples and Comparative Examples under the following conditions in accordance with SAE J2260.

Environmental temperature: 23° C.

Environmental relative humidity: 50%

The results are shown in Table 2 below.

Adhesive Strength Test

The three-layer tube of each of Examples and Comparative Examples was cut, and thus a test piece in a strip form (width: 5 mm; length: 110 mm or greater) was obtained.

Then, it was attempted to preliminarily peel off a layer from the test piece for approximately 30 mm from the edge by a utility knife; however, preliminary peeling failed in all the three-layer tubes of Examples and Comparative Examples. Thus, the adhesive strength test was not performed.

The results are shown in Table 2 below.

Impact Test at Low Temperature

DIN 73378

The Charpy impact test was performed for the three-layer tube of each of Examples and Comparative Examples under the following conditions in accordance with DIN 73378 (n=10). The number of broken pieces was counted among 10.

Rate: 3.8 m/sec

Work: 7.5 J

Temperature: −40° C.

The results are shown in Table 2 below.

SAE J2260

An impact test was performed for the three-layer tube of each of Examples and Comparative Examples under the following conditions in accordance with SAE J2260 (n=10). The number of broken pieces was counted among 10.

Hammer weight: 912 g

Hammer tip size: 15.88 mm

Drop height: 305 mm

Temperature: −40° C.

The results are shown in Table 2 below.

SAE J844

An impact test was performed for the three-layer tube of each of Examples and Comparative Examples under the following conditions in accordance with SAE J844 (n=10). The number of broken three-layer tubes was counted among 10 three-layer tubes.

Hammer weight: 454 g

Hammer tip size: 15.88 mm

Drop height: 305 mm

Temperature: −40° C.

The results are shown in Table 2 below.

TABLE 2

| | | | Example 2-1 | Example 2-2 | Comparative Example 2-1 | Comparative Example 2-2 | Comparative Example 2-3 | Comparative Example 2-4 |
|---|---|---|---|---|---|---|---|---|
| Resin Composition for Adhesive Layer in Multilayer Tube | | Example 1-1 (polyamide resin (B): B-1) | ○ | | | | | |
| | | Example 1-2 (polyamide resin (B): B-2) | | ○ | | | | |
| | | Comparative Example 1-1 (polyamide resin (B): B-3) | | | ○ | | | |
| | | Comparative Example 1-2 (polyamide resin (B): B-4) | | | | ○ | | |
| | | Comparative Example 1-3 (polyamide resin (B): B-5) | | | | | ○ | |
| | | Comparative Example 1-4 (polyamide resin (B): B-6) | | | | | | ○ |
| Discharge Pressure of Resin Composition for Adhesive Layer During Coextrusion Molding (MPa) | | | 9 to 10 | 6 to 8 | 2 to 4 | 6 to 7 | 3 to 4 | 4 to 5 |
| | Domain size in adhesive layer | | ○ | Δ | x | Δ | x | x |
| Physical properties of multilayer tube | Tensile test (SAE J2240) | Tensile strength at break (MPa) | 39 | 37 | 39 | 38 | 36 | 34 |
| | | Tensile elongation at break (%) | 201 | 186 | 208 | 180 | 183 | 185 |
| | Adhesive strength test (Evonik method) | Between outer layer/adhesive layer | Peeling failed | Peeling failed | Peeling failed | Peeling failed | Peeling failed | Peeling failed |
| | | Between adhesive layer/inner layer | Peeling failed | Peeling failed | Peeling failed | Peeling failed | Peeling failed | Peeling failed |
| | Impact test at low temperature | DIN 73378 | 0 pieces/10 pieces | 0 pieces/10 pieces | 0 pieces/10 pieces | 0 pieces/10 pieces | 0 pieces/10 pieces | 0 pieces/10 pieces |
| | | SAE J2260 | 0 pieces/ | 0 pieces/ | 0 pieces/ | 0 pieces/ | 0 pieces/ | 0 pieces/ |

TABLE 2-continued

| | | Example 2-1 | Example 2-2 | Comparative Example 2-1 | Comparative Example 2-2 | Comparative Example 2-3 | Comparative Example 2-4 |
|---|---|---|---|---|---|---|---|
| (−40° C.) | | 10 pieces | 10 pieces | 10 pieces | 10 pieces | 10 pieces | 10 pieces |
| | SAE J844 | 0 pieces/ 10 pieces | 0 pieces/ 10 pieces | 0 pieces/ 10 pieces | 0 pieces/ 10 pieces | 0 pieces/ 10 pieces | 0 pieces/ 10 pieces |

As shown in Table 2 above, all of the three-layer tubes of Examples and Comparative Examples had excellent results in the tensile test, the adhesive strength test, and the impact resistance test at a low temperature.

Furthermore, as shown in Table 2 above, Examples had smaller domain sizes compared to those of Comparative Examples 2-1, 2-3, and 2-4.

Then, an image of the cross section of the three-layer tube was taken by an optical microscope, and thicknesses of the adhesive layer were measured at 10 or more positions.

Then, "(maximum value of thickness of adhesive layer-minimum value of thickness of adhesive layer)/arithmetic mean value of thickness of adhesive layer" was used as "variation in thickness of adhesive layer".

The result is shown in Table 3 below.

TABLE 3

| | | | | Example 2-1 | Example 2-2 | Comparative Example 2-1 | Comparative Example 2-2 | Comparative Example 2-3 | Comparative Example 2-4 |
|---|---|---|---|---|---|---|---|---|---|
| Resin Composition for Adhesive Layer in Multilayer Tube | Example 1-1 (polyamide resin (B): B-1) | | | ○ | | | | | |
| | Example 1-2 (polyamide resin (B): B-2) | | | | ○ | | | | |
| | Comparative Example 1-1 (polyamide resin (B): B-3) | | | | | ○ | | | |
| | Comparative Example 1-2 (polyamide resin (B): B-4) | | | | | | ○ | | |
| | Comparative Example 1-3 (polyamide resin (B): B-5) | | | | | | | ○ | |
| | Comparative Example 1-4 (polyamide resin (B): B-6) | | | | | | | | ○ |
| Thickness of adhesive layer | Measured value | 1 | mm | 0.111 | 0.100 | 0.087 | 0.122 | 0.100 | 0.117 |
| | | 2 | | 0.112 | 0.127 | 0.126 | 0.120 | 0.094 | 0.072 |
| | | 3 | | 0.102 | 0.106 | 0.090 | 0.089 | 0.111 | 0.072 |
| | | 4 | | 0.116 | 0.103 | 0.108 | 0.112 | 0.097 | 0.108 |
| | | 5 | | 0.106 | 0.098 | 0.118 | 0.106 | 0.114 | 0.103 |
| | | 6 | | 0.107 | 0.107 | 0.099 | 0.103 | 0.092 | 0.114 |
| | | 7 | | 0.089 | 0.101 | 0.116 | 0.110 | 0.114 | 0.120 |
| | | 8 | | 0.106 | 0.097 | 0.108 | 0.072 | 0.109 | 0.117 |
| | | 9 | | 0.111 | 0.119 | 0.081 | 0.133 | 0.088 | 0.095 |
| | | 10 | | 0.096 | 0.119 | 0.088 | 0.120 | 0.073 | 0.089 |
| | | 11 | | 0.105 | 0.111 | | 0.135 | 0.08 | 0.085 |
| | | 12 | | 0.114 | 0.110 | | 0.104 | 0.099 | 0.102 |
| | | 13 | | 0.117 | 0.105 | | 0.078 | 0.083 | 0.089 |
| | | 14 | | 0.093 | 0.098 | | 0.092 | 0.117 | 0.109 |
| | | 15 | | 0.116 | 0.098 | | 0.120 | 0.115 | 0.106 |
| | | 16 | | 0.105 | 0.095 | | 0.117 | 0.085 | 0.082 |
| | | 17 | | 0.118 | 0.108 | | 0.092 | 0.098 | 0.091 |
| | | 18 | | 0.112 | 0.113 | | 0.112 | 0.1 | 0.095 |
| | | 19 | | 0.115 | 0.099 | | 0.074 | 0.098 | 0.079 |
| | | 20 | | 0.112 | | | 0.117 | 0.124 | 0.084 |
| | | 21 | | 0.110 | | | 0.118 | 0.124 | 0.098 |
| | | 22 | | 0.108 | | | 0.087 | 0.119 | 0.100 |
| | | 23 | | 0.099 | | | | 0.09 | 0.116 |
| | | 24 | | 0.092 | | | | 0.096 | 0.114 |
| | | 25 | | 0.093 | | | | | 0.101 |
| | Arithmetic mean value | | | 0.107 | 0.106 | 0.102 | 0.106 | 0.101 | 0.098 |
| | Maximum value | | | 0.118 | 0.127 | 0.126 | 0.135 | 0.124 | 0.120 |
| | Minimum value | | | 0.089 | 0.095 | 0.081 | 0.072 | 0.073 | 0.072 |
| | (Maximum value − minimum value)/arithmetic mean value | | — | 0.272 | 0.302 | 0.441 | 0.594 | 0.506 | 0.488 |

Furthermore, as shown in Table 2 above, in Examples, the discharge pressure at the time of coextrusion molding was larger and molding was easier compared to the cases of Comparative Examples 2-1, 2-3, and 2-4.

Variation in Thickness of Adhesive Layer

The three-layer tube of each of Examples and Comparative Examples was cut perpendicular to a length direction.

As shown in Table 3 above, compared to Comparative Examples in which the terminal amino group concentration of the polyamide resin in the resin composition for an adhesive layer was 46 mmol/kg or less, Examples, which were within the scope of the present disclosure, had a smaller "(maximum value of thickness of adhesive layer-minimum value of thickness of adhesive layer)/arithmetic mean value of thickness of adhesive layer", which was the variation in the thickness of the adhesive layer.

Therefore, according to the present disclosure, a resin composition for an adhesive layer that can readily suppress variation in thickness of an adhesive layer when the adhesive layer is made of the resin composition for an adhesive layer by melt extrusion molding is provided.

REFERENCE SIGNS LIST

X: Multilayer tube, X1: First layer, X2: Second layer, X3: Adhesive layer

The invention claimed is:

1. A resin composition for an adhesive layer, the resin composition comprising:

a polyphenylene sulfide-based resin (A);

a polyamide resin (B);

a first thermoplastic resin (C) containing at least one type of functional group selected from the group consisting of an epoxy group, an acid anhydride group, a carboxyl group, a carboxylic acid salt, and a carboxylic acid ester; and a second thermoplastic resin (D) that is free of epoxy groups, acid anhydride groups, carboxyl groups, carboxylic acid salts, and carboxylic acid esters, wherein the resin composition contains, with respect to 100 parts by weight of the polyphenylene sulfide-based resin (A), from 80 to 300 parts by weight of the polyamide resin (B), from 20 to 200 parts by weight of the first thermoplastic resin (C), and from 10 to 100 parts by weight of the second thermoplastic resin (D), and a terminal amino group concentration of the polyamide resin (B) is from 48 to 120 mmol/kg.

2. The resin composition for an adhesive layer according to claim 1, wherein a melt mass-flow rate at 230° C. of the polyamide resin (B) is from 1 to 50 g/10 min.

3. The resin composition for an adhesive layer according to claim 1, wherein the polyamide resin (B) contains at least one of polyamide 11 or polyamide 12.

4. The resin composition for an adhesive layer according to claim 1, wherein the resin composition has a matrix-domain structure including matrix and a domain, the polyamide resin (B) is contained in the matrix, and the polyphenylene sulfide-based resin (A) is contained in the domain.

5. A multilayer tube in which three or more layers are layered, the multilayer tube comprising:

a first layer containing a polyamide resin;

a second layer arranged in an inner periphery side of the multilayer tube with respect to the first layer and containing a polyphenylene sulfide-based resin; and an adhesive layer arranged in between the first layer and the second layer and bonding the first layer and the second layer, wherein the adhesive layer is made of the resin composition for an adhesive layer according to claim 1.

6. The multilayer tube according to claim 5, wherein the polyamide resin in the first layer contains at least one of polyamide 11 or polyamide 12.

7. The multilayer tube according to claim 5, wherein the second layer further contains an epoxy-modified thermoplastic resin, and the second layer contains, with respect to 100 parts by weight of the polyphenylene sulfide-based resin, from 1 to 50 parts by weight of the epoxy-modified thermoplastic resin.

* * * * *